Dec. 16, 1952 — C. P. HELIN — 2,621,438
FISHHOOK ASSEMBLY
Filed Jan. 4, 1950

INVENTOR.
Charles Pontus Helin
BY
Barnes, Kisselle, Laughlin & Raisch
Attorneys.

Patented Dec. 16, 1952

2,621,438

UNITED STATES PATENT OFFICE 2,621,438

FISHHOOK ASSEMBLY

Charles Pontus Helin, Detroit, Mich.

Application January 4, 1950, Serial No. 136,744

8 Claims. (Cl. 43—42.44)

This invention relates to a fish-hook assembly and more particularly to fish-hooks of the type which are commonly used with so-called fish lures or casting bait.

It is common practice to mount two single hooks on a fish lure or casting plug by means of a screw eye or ring which passes through the eyes of the hooks. With any fishing lure or casting plug it is highly desirable to present to the fish striking such lure or plug as many fish-hook barbs as there are fish-hooks on the plug because this enhances the chances or probability of hooking the fish as it strikes the plug or lure.

The above manner of mounting individual fishhooks on a plug or lure is disadvantageous because the hooks can turn on the ring to a position where the one hook substantially overlaps the other, as illustrated in Fig. 6. When this occurs, for all practical purposes the two barbs are only as effective as though but one single barb of a hook were free and presented to the fish as it strikes the lure and the chances of hooking the fish as it strikes the lure is not as great as if the hooks were maintained separate so that their individual barbs are free from each other and individually presented to, and in a position where they can impale, the fish as it strikes.

It is an object of this invention to produce a fish-hook assembly which is more efficient than the assemblies now in use and which will at all times present the points or barbs of the individual hooks freely to the fish as it strikes and in which each hook is maintained with respect to its companion hook so that the area in which the barb of the one hook operates is separate from, and independent of, the area in which the other barb hook operates.

Figure 1:
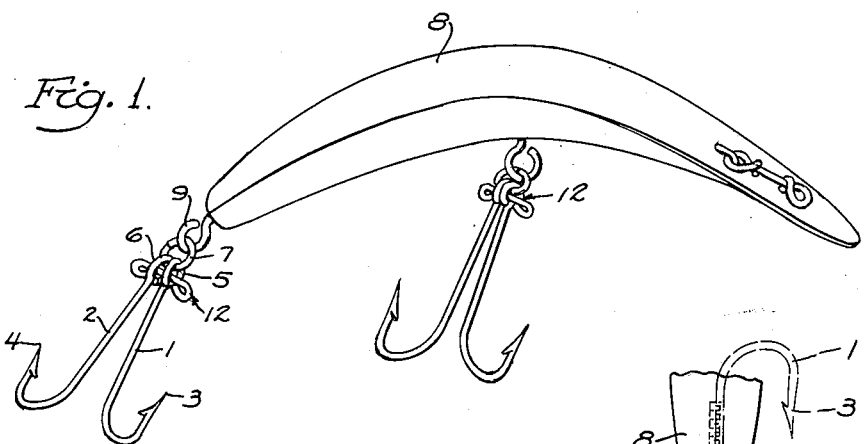
Fig. 1 is a perspective view showing my hook assembly applied to a well-known casting plug.

Referring more particularly to the drawing it will be seen that my fish-hook assembly comprises hooks 1 and 2 provided with barbs 3 and 4 and eyes 5 and 6 respectively and ring 7 passing through eyes 5 and 6. By way of illustration, my hooks 1 and 2 are secured to a well-known casting plug 8 by a screw eye 9 which passes through ring 7. It will be noted that each eye 5 and 6 is positioned in a plane substantially at right angles to the plane passing through the U-shaped barbed ends 10 and 11 respectively of hooks 1 and 2. Shanks 24, 25 of the hooks are straight.

Figure 2:
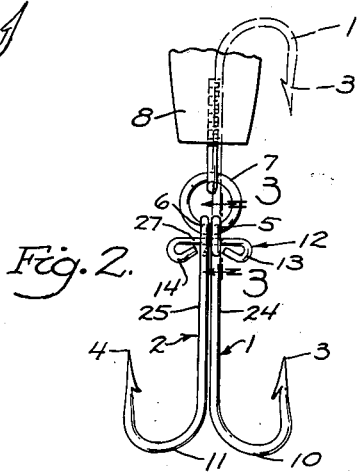
Fig. 2 is an elevation of my hook assembly.
Figure 3:
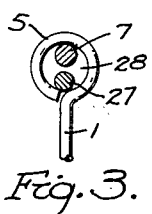
Fig. 3 is a section along the line 3—3 of Fig. 2.
Figure 6:
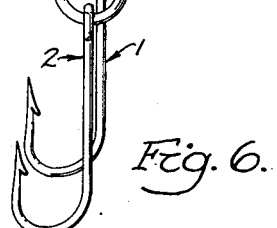
Fig. 6 is an illustrative elevation of a conventional hook assembly showing how the hooks orientate themselves in overlapping relation on their securing ring.

Eyes 5 and 6 are positioned back to back and maintained substantially centered by a pintle member 12 which passes through eyes 5 and 6. As shown in Figs. 1 to 3, the pintle member comprises a length of wire, the ends 13 and 14 of which are return bent back upon the body 14 of pintle member 12. Ends 13 and 14 function to keep eyes 5 and 6 substantially in back to back relation and prevent eyes 5 and 6 from separating any substanital extent on ring 7. It is preferable that eyes 5 and 6 be maintained in back to back pivotal contact but return bent portions 13 and 14 can be spaced to permit a limited movement of eyes 5 and 6 away from each other along body 27 of pintle 12 and along ring 7. The main essential is that eyes 5 and 6 be maintained closely enough together so that the hook eye 5 cannot move sufficiently away from the other eye 6 and around ring 7 until the one hook is superimposed upon the other, as illustrated in Fig. 6, in which case as the plug is drawn through the water the barb of the one hook follows substantially in line with the barb or point of the other hook.

Pintle 12 maintains eyes 5 and 6 substantially back to back so that hooks 1 and 2 can pivot about pintle 12 in the parallel planes passing through their respective eyes 5 and 6, but points 3 and 4 will always be spread apart substantially the distance illustrated in Fig. 2. Pintle 12 will always maintain barbs 3 and 4 on opposite sides of a plane passing between eyes 5 and 6 and perpendicular to pintle or axis 12. Pintle 12 preferably prevents any substantial separation of eyes 5 and 6 circumferentially along ring 7 and therefore hooks 1 and 2 are positively held from turning on ring 7 to the overlapping position shown in Fig. 6 where both hook points 3 and 4 would be on the same side of a plane passing between the points 5 and 6 and substantially perpendicular to pintle 12. Pintle 12 always maintains barbs 3 and 4 of companion hooks 1 and 2 spaced laterally on opposite sides of shanks 24 and 25 regardless of the angular relation of hook 1 to hook 2 about pintle 27 as an axis (see full and dotted line showing, Fig. 2) so that the hooks 1 and 2 function independently of each other and do not, from the practical standpoint, form a single hook as is the case with the two hooks illustrated in Fig. 6. Since there is a small clearance 28, Fig. 3, between each eye 5, 6 and pintle body 27, each hook can turn to a limited extent about its shank 24 or 25 as an axis but less than about 45° on either side of the position shown in full lines, Fig. 2, wherein U hook portions 10 and 11 are in substantially the same plane.

Hooks 1 and 2 are free to pivot about pintle 12 as an axis, as illustrated in the dotted line showing of hook 1, Fig. 2, but eyes 5 and 6 cooperate with pintle 12 to restrain both hooks 1 and 2 from rotating or turning in such manner upon their support 7 so that the one hook will overlap the other.

Figure 4:
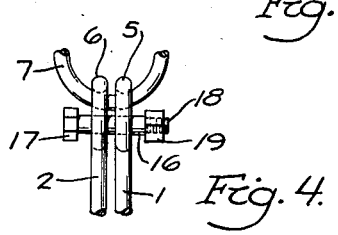
Figs. 4 and 5 are detailed fragmentary elevational views illustrating modifications of my hook assembly.
Figure 5:
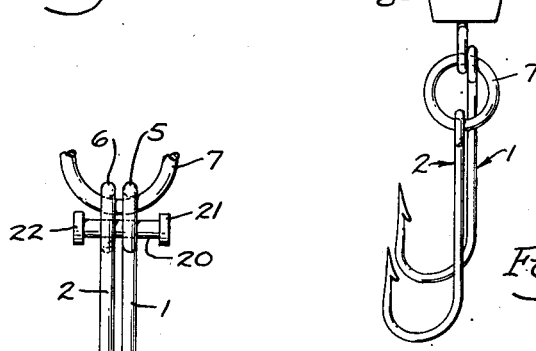

Figs. 4 and 5 illustrate two modified forms of pintle. Instead of a pintle 12 in the form of a straight wire having its ends 13 and 14 return bent, pintle 16 takes the form of a bolt passing through eyes 5 and 6 having a head 17 on one end and the other end 18 threaded and a nut 19 screwed thereon. Pintle 16 functions exactly the same as pintle 12.

In Fig. 5 pintle 20 takes the form of a cylindrical rivet passing through eyes 5 and 6 and having both ends headed over as at 21 and 22.

It will be noted that all of the pintles permit eyes 5 and 6 to separate by limited movement axially along the pintle and circumferentially along ring 7 but the extent to which eyes 5 and 6 can separate is never sufficient to permit either hook to turn and overlap the other.

I claim:

1. A fish-hook assembly comprising at least two separate hooks, each hook comprising a shank with a U portion and a barb at one end and an eye at the other, pintle means passing loosely through said eyes, and a ring member also passing loosely through said eyes, the barb end of each hook being positioned axially outwardly of the eye end thereof and the barb ends of said hooks being positioned on opposite sides of said shanks regardless of the angular position of either hook about said pintle means, said hooks being free to pivot independently about said pintle means and said ring as an axis and being free to shift circumferentially as a unit around said ring member.

2. The fish-hook assembly claimed in claim 1 wherein the eyes on said hooks are juxtaposed on said pintle means.

3. The fish-hook assembly claimed in claim 2 wherein the eye of each hook is positioned in a plane which is substantially perpendicular to the plane in which the barb and U portion of the hook is positioned.

4. A fish-hook assembly comprising at least two separate hooks, each hook comprising a shank with a barb at one end and an eye at the other end, a pintle passing through said eyes and having enlargements at opposite ends for retaining the pintle loosely in said eyes, and a ring member also passing through said eyes, the barb end of each hook being positioned axially outwardly of the eye end thereof and the barb ends of said hooks being positioned on opposite sides of said shanks regardless of the angular position of either hook about said pintle.

5. The fish-hook assembly claimed in claim 4 including a plug, and means for securing the ring to said plug.

6. The fish-hook assembly claimed in claim 5 wherein said means comprises a screw eye passing through said ring and threaded into said plug.

7. A fish-hook assembly comprising at least two separate hooks, each hook comprising a shank in the form of a U at one end with a barb positioned at the outer end of said U, the other end of said shank being bent back upon itself to form an eye, the said eye being located in a plane generally at right angles to the plane of said U end portion, a pintle passing loosely through said eyes and serving as an axis about which said hooks can pivot, the one hook being positioned on said pintle in reverse position to the other hook, and a ring member also passing through said eyes.

8. The combination set forth in claim 7 wherein said pintle and said ring pass loosely through said eyes, said enlargements at the opposite ends of said pintle being spaced slightly in a direction axially away from said eyes whereby said hooks are free to pivot independently of one another about said ring and said pintle as an axis, are free to shift circumferentially as a unit around said ring member, and are free to travel a limited extent away from each other in a direction axially of said pintle and circumferentially of said ring member.

CHARLES PONTUS HELIN.

REFERENCES CITED

The following references are of record in the file of this patent:

UNITED STATES PATENTS

| Number | Name | Date |
| --- | --- | --- |
| D. 147,044 | Hilton | July 8, 1947 |
| 454,581 | Mack | June 23, 1891 |
| 730,064 | Wilson | June 2, 1903 |
| 986,747 | Olson | Mar. 14, 1911 |
| 1,069,171 | Phillips | Aug. 5, 1913 |
| 1,497,023 | Palmer | June 10, 1924 |
| 2,133,032 | Martz | Oct. 11, 1938 |
| 2,357,472 | Jenkins | Sept. 5, 1942 |